United States Patent Office 3,331,324
Patented July 18, 1967

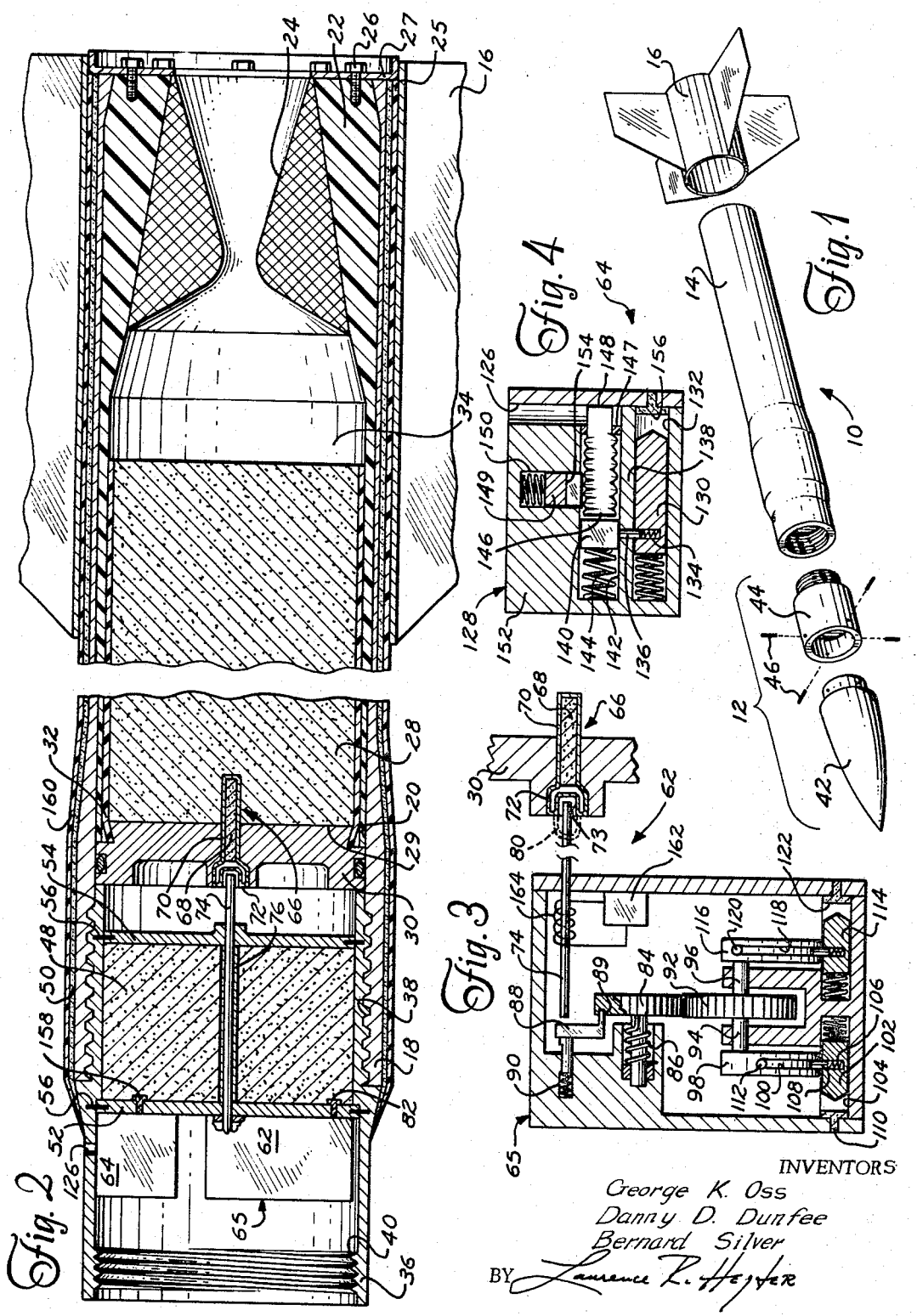

3,331,324
FRANGIBLE MOTOR
George K. Oss, North Springfield, and Danny D. Dunfee and Bernard Silver, Fairfax, Va., assignors to Atlantic Research Corporation, a corporation of Virginia
Filed Aug. 25, 1965, Ser. No. 482,392
15 Claims. (Cl. 102—49.5)

This invention relates to propulsion motors and, more particularly, to a fragmentation system for high-altitude propulsion motors to obviate the danger inherent in the return of such motors to earth.

Various types of vehicles are presently employed as high altitude transports. These include ballons, kites, ducted motors and, more recently, rocket motors. One of the principal uses of rockets is for scientific research with particular emphasis on meteorological rockets which permit the measurement of environmental conditions such as temperature and pressure at various altitudes. One of the primary restrictions on the use of such meteorological rockets is the danger inherent in the return of these rockets to earth. This danger prohibits the use of rockets in populated areas where the potential of personal injury and property damage is high. Consequently, maximum utilization of this scientific tool is prevented. Destruction systems are commonly used on rockets but these systems merely render the rockets inoperative. Present destruct systems do not fragment the rocket to eliminate danger propensity of returning-to-earth rockets.

Accordingly, it is one object of this invention to provide an improved fragmentation system for use with a rocket in order to sufficiently fragment the rocket so as to produce pieces which will not have a dangerous impact energy level upon their return to earth.

It is another object of this invention to provide an improved fragmentation system for use with a rocket which is capable of self-induced fragmentation subsequent to the attainment of the objectives of the rocket flight.

It is another object of this invention to provide an improved fragmentation system for use with a rocket which is capable of remotely induced fragmentation.

Briefly described, this invention, in one form, comprises a combination of a conventional propulsion motor such as a rocket and a fragmentation system for the rocket. The rocket includes a payload section (for example, one housing meteorological instruments), and a cylindrical motor casing having mounted on its aft end a plurality of fins. The casing defines a combustion chamber in which is mounted a solid propellant grain. At the aft end of the combustion chamber is located an exhaust nozzle which is mounted within the aft end of the casing. A head plate is conventionally mounted at the forward end of the combustion chamber and axially supports the solid propellant grain.

The fragmentation system comprises a modular primary explosive charge mounted within the casing immediately forward of the head plate and a secondary explosive charge in sheet form attached to and substantially surrounding the entire external surface of the casing. The fin assembly is designed to permit mounting thereof subsequent to the application of the sheet explosive charge such that the secondary explosive charge resides between the casing and the fins. A primary charge initiation device is provided which is responsive to the temperature of the forward end of the propellant grain such that when burning progresses to a portion of the grain near the head plate the initiation device actuates and, through appropriate timing devices, detonates the primary charge at a predetermined time. The external secondary charge is sympathetically initiated by the shock produced by the internal primary charge. It is the function of the primary charge to fragment the head plate and any major structure existing at the forward end of the rocket while it is the function of the secondary charge to fragment the casing, the fins, and the nozzle section, as well as any remaining propellant.

In order to shield the secondary explosive charge from environmental conditions, a protective coating is applied to its entire external surface. The protective coating, in addition to physically separating the secondary charge from the surroundnig environment, also serves as a thermal insulator to reduce the temperature to which the explosive charge is exposed during flight.

This invention will be better understood from the following description taken in combination with the accompanying drawings in which, FIGURE 1 is an exploded perspective view of a rocket employing the fragmentation system of this invention, FIGURE 2 is a sectional view of the motor portion of the rocket of FIGURE 1 illustrating the fragmentation system of this invention, FIGURE 3 is a sectional view of a primary initiator, and FIGURE 4 is a sectional view of a redundant initiator.

While the fragmentation system of this invention can be employed with any high altitude propulsion motor, for discussion purposes the embodiment described herein is designed for use with a rocket. A rocket has been chosen because of its current popularity as a scientific instrument.

Adverting now to the drawing, and more particularly to FIGURE 1, there is illustrated an exploded view of a meteorological rocket 10 in order to emphasize the various sections of such a rocket. The rocket is formed of three basic sections, a forward or payload section 12, a middle or motor section 14, and a fin canister 16 designed for mounting on the aft end the motor section 14.

Referring now to FIGURE 2, there is shown a detailed cross section of the motor section 14 with the fin canister 16 mounted in place. The motor section comprises a cylindrical casing 18 which may be fabricated from any conventional casing material, for example, plastic, plastic reinforced with fillers, plastic-bonded glass filament or metals such as aluminum. Because the objective of this invention is to provide a system for fragmenting a rocket into particles which will yield very low impact kinetic energy, subsequent to the attainment of the objectives of the rocket flight the primary requirement of the casing material is that it permit fragmentation into a multitude of pieces. It has been found that a preferred casing is fabricated from a wound plastic bonded glass filament. A conventional insulator shell 20 is secured within the casing 18 and is formed with an inwardly flared aft end 22. A nozzle insert 24 is bonded within the flared aft end 22. The insert 24 is fabricated of a temperature-resistant material which is not substantially effected by the environment of high-velocity high-temperature gases. An example of such a material is graphite.

The fin canister 16 fits snugly over the aft end 25 of the casing 18 and is held in place by a plurality of screws 26 extending through a flange 27 provided on the rear of the canister 16.

A cylindrical solid propellant grain 28 is fitted within the motor section 14. The grain 28 may be of any conventional configuration such as a perforated internal burner or an end burner as illustrated in FIGURE 2. The particular grain configuration and formulation are determined by conventional design analysis based upon the desired flight parameters. The forward end 29 of the grain 28 is bonded to a head plate 30 and a flame inhibitor 32 is bonded to the outer surface of the grain 28 and a portion of the head plate 30. The inhibitor 32 serves to help secure the grain 28 to the head plate 30 as well as prevent burning of the external surface of the grain 28. The inhibited grain head plate assembly is then loaded into the combustion chamber 34 defined by the casing 18.

An annular payload adapter sleeve 36 is received by the forward portion of the casing 18 which is internally threaded as shown at 38. The sleeve 36 serves to hold the head plate 30 in position within the casing 18, to house a portion of the fragmentation system to be described below, and to receive a portion of the payload section 12 by means of a threaded forward end 40 of the sleeve 36.

Any type of payload can be transported by the rocket of this invention. FIGURE 1 generally illustrates a payload section 12 formed of two portions, an ejectable instrument portion 42 which is returnable to earth by parachute (not shown) and a retainer or parachute housing 44 which is threadably attached to the sleeve 36. The instrument portion 42 is attached to the retainer 44 by shear pins 46 and is ejected by a gas generator actuated piston (not shown) which shears the pins 46 during ejection. Further detail of the structure of payload section 12 and the attachment thereof to the motor section 14 is unnecessary since they do not form a part of this invention. It should be noted, however, that such structure is well-known in the meteorological rocket field.

The fragmentation system alluded to earlier comprises the combination of an internal primary explosive charge 48 and an external secondary explosive charge 50. The primary charge 48 is a modular charge housed within the sleeve 36 and located adjacent to the head plate 30. A forward retaining plate 52 and a rearward retaining plate 54 enclose the primary explosive charge 48 and are fixedly attached to the sleeve 36 by means of pins 56. The primary charge 48 may be any conventional high explosive, for example, cyclotrimethylenetrinitramine, or a composition of 60% cyclotrimethylenetrinitramine, 40% trinitrotoluene and traces of beeswax.

The secondary explosive charge 50, formed as a relatively thin sheet, is mounted on the external surface of the casing 18. The secondary charge 50 covers substantially the entire external surface of the casing 18 and resides between the casing 18 and the fin canister 16. In order to secure the secondary charge 50 to the casing 18, the casing is prepared with a suitable adhesive (not shown). It has been found that a pressure-sensitive glass fiber tape having a silicon adhesive on both sides satisfactorily bonds the secondary charge 50 to the casing 18 when the casing is fabricated of plastic-bonded glass filaments. The secondary charge 50 can be formed as a tape and wound about the casing 18 or it can be fabricated in sheet form which is applied to the adhesive-coated casing 18. A commercially available explosive, pentaerythrite tetranitrate, mixed with an elastomeric binder to form a flexible explosive has been successfully employed, however, other explosives such as those referred to above for use as the primary charge could be used if fabricated in such a manner as to conform to the external contour of the motor case 18.

The rocket 10 described above is intended to be flown to a predetermined altitude at which time the instrument portion 42 of the payload section 12 is ejected from the retainer 44 in order to take the desired measurements of environmental conditions. The purpose of this invention is to sufficiently fragment the retainer 44, the motor section 14, and fin canister 16 to particle sizes sufficiently small so as to provide very low impact energy levels, thereby precluding the return to earth of pieces of the spent motor assembly having a dangerous impact energy level. After the motor has performed its function of powering the payload to the desired altitude, the primary charge 48 is detonated, thereby inducing sympathetic detonation of the secondary charge 50. FIGURES 2–4 illustrate one specific detonation system comprising a primary initiator 62 and a redundant or secondary initiator 64, both of which are housed in the sleeve 36. The primary initiator 62 comprises a timer 65 and a temperature-sensitive gas generator 66 centrally mounted in the head plate 30 with a portion thereof extending rearwardly into the propellant grain 28. The gas generator 66, which actuates the timer 65, includes a propellant composition 68 such as lead selenium nitrate starch or a combination of lead mono-nitroresorcinate and potassium nitrate, sulfur and charcoal (black powder), contained in a thermally conductive housing 70. As may be seen in FIGURE 3, the gas generator housing 70 is formed with a relatively thin wall and an expandable head 72 having a "dimpled" or concave end 73. A push rod 74 extends through the primary charge 48 and is separated therefrom by a sleeve 76. The rearward end of the rod 74 is received by the expandable head 72 while the forward end of the rod 74 is received by the timer 65. When the temperature of the propellant grain 28 in the area immediately adjacent to the gas generator 66 attains a predetermined level, which will occur near the termination of motor burning when the grain 28 is almost spent, the composition 68 ignites and produces gaseous products of combustion which project the concave end 73 of the expandable head 72 outwardly as can be seen by the dotted lines 80 in FIGURE 3. Expansion of the head 72 effects forward movement of the push rod 74 which actuates the timer 65. The timer 65 may be of any conventional type such as a spring-loaded mechanical timer or electrical timer. The timer serves to control the time at which the instrument portion 42 of the payload section 12 is ejected and, after a predetermined time interval subsequent to the ejection of the instrument portion 42, the timer then actuates a chain of booster charges 82 which detonate the primary charge 48.

While various types of timers can be used, one specific mechanical timer 65 is illustrated in FIGURE 3. The timer includes a motor gear 84 torque biased by a spring 86 but refrained from movement by a dog 88. The dog 88 is received by a slot 89 in the face of the gear 84 and is urged into contact with the gear by a spring 90. The gear 84 drivingly engages a second gear 92 having shafts 94, 96 extending from the front and rear faces, respectively, thereof. The shaft 94 extending from the front face drives a cam 98 having a groove 100 in the periphery thereof. A spring-loaded firing pin 102 is mounted in a passageway 104 adjacent to the cam 98. The firing pin 102 is provided with a cavity 106 in which is spring-loaded a restraining pin 108. The pin 108 projects from the firing pin 102 and is received by the groove 100 in the cam 98 thus preventing the firing pin 108 from moving. A percussion primer 110 is mounted spaced from, but aligned with the firing pin 102 and cooperates with a gas generator (not shown) to eject the instrument portion 42. When the push rod is moved forwardly by the expanded head 72, it disengages the dog 88 from the motor gear 84. The spring 86 rotates the motor gear 84 which, in turn, rotates the gear 92, shaft 94, and cam 98. The restraining pin 108 rides in the groove 100 until a deep recess 112 provided in the cam 98 is aligned with the restraining pin 108 at which time the restraining pin 108 is ejected from the firing pin 102 into the recess 112 removing all restraint on the firing pin. The spring-loaded firing pin 102 is accelerated forwardly impinging upon the percussion primer 110 causing ignition thereof and, consequently, ignition of the instrument portion gas generator (not shown).

An identical system is employed for timing the actuation of spring-loaded second firing pin 114 for igniting the chain of booster charges 82 for detonating the primary charge 48. A cam 116 having a groove 118 and a deep recess 120 in the periphery thereof is mounted on the rearwardly projecting shaft 96. The gear 92 continues to rotate after release of the first firing pin 102 and, at a predetermined time interval, releases the second firing pin 114 which impinges upon a percussion primer 122 igniting the chain of booster charges 82 and the primary charge 48. It can be seen that the primary initiator 62 is an internally housed system, the operation of which is independent of ambient conditions.

A redundant initiator 64 is provided for safety reasons in the event the primary initiator 62 fails to function properly. The redundant initiator 64, illustrated in FIGURE 4, comprises a bellows assembly 124 which communicates with the atmosphere by means of a port 126 extending through the initiator housing 128 and sleeve 36. A firing pin 130, spring-loaded in a chamber 132, is provided with a cavity 134 for receiving a spring-loaded restraining pin 136. The restraining pin 136 extends through a wall 138 defining one side of the chamber 132 and is prevented from being ejected by a block 140. The block 140 is located in a raceway 142 parallel to the chamber 132 and is prevented from sliding in the raceway 142 by a fully extended spring 144. The block 140 in its normal position sits directly on the restraining pin 136 holding it in place and effecting locking of the firing pin 130 in a cocked position as can be seen in FIGURE 4. The bellows 124 is also housed in the raceway 142 and, when fully extended, the end face 146 of the bellows lies adjacent to but cannot touch the block 140. The raceway is provided with air at slightly less than launch site atmospheric pressure and the pressure is maintained by a seal 147. The pressure allows the bellows 124 to be fully extended at the launch site but, as the rocket ascends and the pressure within the bellows is reduced, the bellows is retracted into a closed position. Therefore, when the bellows is fully extended and the firing pin 130 is locked, which is the position the redundant initiator is in prior to and during launch, there is no chance of activating the initiator 64. As the rocket 10 rises after launch, the ambient pressure decreases causing the bellows to retract and slide toward its fixed end 148 which is the end remote from the block 140. When the rocket reaches a predetermined altitude the bellows 124 will have retracted sufficiently to expose a spring-loaded actuator 149 which is housed in a recess 150 in a wall 152 defining one surface of the raceway 142. The actuator 149 is provided with a recess 154 in the surface facing the firing pin 130. The actuator 149 is forced into the raceway 142 between the bellows 124 and the block 140 and the redundant initiator 64 is now armed.

If the primary initiator 62 fails to detonate the primary charge as the spent motor 14 descends, the ambient pressure and, therefore, the internal pressure of the bellows 124 increases causing the bellows to expand. Expansion of the bellows 124 pushes the actuator 149 until it abuts the block 140. Further expansion of the bellows displaces the block 140 and places the actuator 149 over the restraining pin 136 which is then ejected into the recess 154 freeing the firing pin 130. The firing pin 130 is then accelerated into contact with a stab detonator 156 which in turn ignites a chain of booster charges 158 and detonates the primary charge 48. It can be seen that the motor 14 will not be able to descend lower than a predetermined altitude before it is destroyed.

The primary initiator 62 or the redundant initiator 64 detonates the primary charge 48. The secondary charge 50 is detonated sympathetically by the shock produced by detonation of the primary charge, thus eliminating the need for additional initiators.

It is the function of the primary charge 48 to fragment the head plate 30, the payload adapter sleeve 36, the retaining plates 52, 54 the primary initiator 62, the redundant initiator 64, the retainer 44, and any other structure remaining forward of the head plate 30. It is the function of the secondary charge 50 to fragment the motor case 18, insulator shell 20, nozzle 24, and the fin canister 16.

In order to isolate the external secondary charge 50 from environmental conditions, which also facilitates ease of handling and storage, the secondary charge has a protective coating applied thereto. The protective coating comprises a glass fiber tape 160 having a silicon pressure-sensitive adhesive on one side and is spirally wrapped about the secondary charge 50. The outer or exposed side of the tape 160 includes an aluminized coating which serves to reflect thermal radiation as well as secure the external explosive material 50 to the motor case 18. The aluminized coating in combination with the glass fiber, which is a thermal insulator, helps to maintain the secondary charge 50 at a relatively low temperature thereby avoiding deterioration of the explosive composition. The casing 18, which is formed of glass fiber, and the insulator shell 20 serve to insulate the secondary charge 50 from the high temperatures existing in the combustion chamber 34.

In addition to serving as a protective coating, the tape 160 also serves to retain the secondary charge 50 on the casing 18 during flight. Without the protective coating there is some possibility that the secondary charge 50 will become loose and peel from the casing.

The embodiment described above employs a self-induced primary initiator 62. However, a remotely induced fragmentation system can be used to permit control of the time of initiation by land-based personnel. For example, reverting to FIGURE 3, a receiver 612 of a radio link is operatively connected to a solenoid 164 which drivingly engages the push rod 74. Alternatively, the solenoid 164 can directly control the second firing pin 114 thus eliminating the need for the cam 116 and its associated mechanism.

The fragmentation system of this invention permits use of scientific rocket motors or other propulsion motors at any location where such use is desired because the danger of falling hazards is eliminated. The combined internal primary charge and external secondary charge ensures the desired degree of fragmentation as differentiated from destruction which still permits the return to earth of pieces of dangerous impact energy levels.

While a specific embodiment has been shown and described above, it will be obvious to those skilled in the art that various changes and modifications may be made without departing from this invention in its broader aspects. For example, in the aforementioned embodiment, the secondary explosive charge is mounted on the external surface of the motor casing. However, if desired, the secondary explosive charge can be located between the casing and the insulator shell or between adjacent layers or windings of the casing. The important feature of the secondary charge is that it extend substantially throughout the length and circumference of the casing in order to achieve fragmentation of the spent motor assembly 10 to particle sizes yielding very low impact kinetic energy at their respective terminal velocities. Also, while a pressure-operated redundant initiator 64 has been described, other types such as a time-controlled initiator can be used. Furthermore, the secondary charge 50 can be modified to extend upwardly into the interior of the fins to ensure complete fragmentation of the fins. It is intended in the appended claims to cover these and other changes and modifications as fall within the true scope and spirit of this invention.

What is claimed as new and desired to be secured by Letters Patent of the United States is:

1. A frangible motor including, in combination, a casing defining a combustion chamber therein and a motor fragmentation system, said fragmentation system comprising (a) a modular primary explosive charge mounted within said casing adjacent to the forward end of said combustion chamber, (b) means to detonate said primary charge, and (c) a sheet secondary explosive charge attached to the external surface of said casing and being separated from said primary charge by said casing, said secondary charge being sympathetically detonated by detonation of said primary charge.

2. A frangible motor including, in combination, a casing defining a combustion chamber therein and a motor fragmentation system, said fragmentation system comprising
(a) a primary explosive mounted within said casing,
(b) a primary initiator to detonate said primary charge,
(c) a redundant initiator to detonate said primary charge upon failure of said primary initiator to operate, and
(d) a sheet secondary explosive charge attached to the external surface of said casing, said secondary charge being sympathetically detonated by detonation of said primary charge.

3. A motor as defined in claim 2 wherein said redundant initiator is responsive to ambient pressure.

4. A frangible rocket motor including a casing defining a combustion chamber therein, a solid propellant grain mounted within said combustion chamber, an exhaust nozzle at the rearward end of said chamber, and a motor fragmentation system, said fragmentation system comprising
(a) a modular primary explosive charge mounted within said casing adjacent to the forward end of said chamber,
(b) means to detonate said primary charge,
(c) a sheet secondary explosive charge rigidly attached to substantially the entire exterior of said casing, said secondary charge being sympathetically detonated by detonation of said primary charge, and
(d) a protective coating applied to said secondary charge to physically insulate said secondary charge from the surrounding environment.

5. A motor as defined in claim 4 wherein said means is remotely actuated.

6. A motor as defined in claim 4 wherein said means is responsive to environmental conditions and is actuated when said conditions attain predetermined values.

7. A motor as defined in claim 4 wherein said means is responsive to the temperature of a portion of said grain.

8. A motor as defined in claim 4 wherein said means is actuated at a predetermined time interval after launch.

9. A motor as defined in claim 4 wherein said casing is fabricated from a nonmetallic material.

10. A motor as defined in claim 4 wherein said casing is fabricated from a material selected from the group consisting of plastic, plastic reinforced with fillers, and plastic-bonded glass filaments.

11. A motor as defined in claim 4 wherein said protective coating has a reflective outer surface.

12. A motor as defined in claim 4 including a fin mounted on said casing, a portion of said secondary charge being located between said casing and said fin.

13. A frangible rocket motor including
(a) a nonmetallic casing defining a combustion chamber therein, said casing having an adhesive on the external surface thereof,
(b) a solid propellant grain mounted within said combustion chamber,
(c) a nozzle at the rearward end of said chamber,
(d) a modular primary explosive mounted within said casing contiguous to the forward end of said chamber,
(e) means to detonate said primary charge,
(f) a sheet secondary explosive charge attached to substantially the entire exterior of said casing by said adhesive, said secondary charge being sympathetically detonated by detonation of said primary charge, and
(g) a thermal protective material applied to the entire external surface of said secondary charge, said protective material having a reflection outer surface and physically separating said secondary charge from the surrounding environment.

14. A motor as defined in claim 12 including a fin mounted on said casing, a portion of said secondary charge being located between said casing and said fin.

15. A motor as defined in claim 12 including a fin mounted on said casing, a portion of said secondary charge being located within the interior of said fin.

References Cited
UNITED STATES PATENTS

| | | | |
|---|---|---|---|
| 2,937,595 | 5/1960 | Margulis et al. | 102—49 |
| 3,135,204 | 6/1964 | Menichelli et al. | 102—49 |
| 3,185,090 | 5/1965 | Weber | 102—49 |

FOREIGN PATENTS

| | | |
|---|---|---|
| 1,291,668 | 3/1962 | France. |

BENJAMIN A. BORCHELT, *Primary Examiner.*

SAMUEL FEINBERG, *Examiner.*

V. R. PENDEGRASS, *Assistant Examiner.*